United States Patent [19]
Barker et al.

[11] Patent Number: 5,696,918
[45] Date of Patent: Dec. 9, 1997

[54] METHOD OF MANAGING MARKER ENTITIES WITHIN A DOCUMENT DATA STREAM

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 255,675

[22] Filed: Oct. 11, 1988

[51] Int. Cl.$^6$ .................................................. G06F 15/00
[52] U.S. Cl. ............................................................ 395/348
[58] Field of Search ..................................... 364/518, 521; 340/747, 750, 706, 724; 395/340, 342, 347, 348, 349, 350, 351, 352, 353, 354

[56] References Cited

U.S. PATENT DOCUMENTS

| | | | |
|---|---|---|---|
| 4,698,624 | 10/1987 | Barker et al. | 340/709 |
| 4,698,625 | 10/1987 | McCaskill et al. | 340/709 |
| 4,843,538 | 6/1989 | Lane et al. | 364/188 |
| 4,843,569 | 6/1989 | Sawada et al. | 364/518 |

FOREIGN PATENT DOCUMENTS 0285449  3/1988  European Pat. Off. .

OTHER PUBLICATIONS

"Page Marks for Page Composition and Document Processing Environments", IBM Technical Disclosure Bulletin, vol. 29, No. 9, Feb. 1987, pp. 3865–3868.

"Layout Method for Document Having Text and Non–Text Areas", IBM Technical Disclosure Bulletin, vol. 30, No. 5, Oct. 1987, pp. 206–207.

"Mapping Appearing on Imaged Pages", IBM Technical Disclosure Bulletin, vol. 31, No. 11, Apr. 1989, pp. 226–227.

*Primary Examiner*—Phu K. Nguyen
*Attorney, Agent, or Firm*—James H. Barksdale, Jr.; Edward H. Duffield; Andrew J. Dillon

[57] ABSTRACT

A method for managing marker entities within a document data stream independently of the content of the data stream. The method provides consistent specification and independent processing of marker entities which may include both text and non-text data and which may be associated physically and/or logically with data stream content at the document or lower order entity level. A define marker structure control is utilized within the data stream to specify in a data type independent fashion the physical structure and content of a marker entity as well as defining any desired relationship of a marker entity with another entity within the data stream. A map marker control is then utilized to control the position within a presentation area where the marker entity is to be imaged. In this manner, the method provides a flexible, efficient and useful manner to associate a marker entity within a document data stream which may be tied to specific layout areas during presentation and which may be easily manipulated at a data stream level.

4 Claims, 5 Drawing Sheets

DATA STREAM EXAMPLE FOR FIGURE 2

| | |
|---|---|
| BDT | BEGIN DATA STREAM |
| ⋮ | |
| BMG | BEGIN MASTER ENVIRONMENT GROUP |
|   DMO (D) |   DEFINE MARKER (D) |
|   OBD (C) |   DEFINE MARKER OBJECT (C) AREA |
|   PGD (E'),(A,B,C) |   DEFINE PAGE MODEL-ODD; SPECIFY OBJECT AREAS ON PAGE |
|   PGD (F'),(A,B,C) |   DEFINE PAGE MODEL-EVEN; SPECIFY OBJECT AREAS ON PAGE |
|   RTD FORMAT(M2), FORMAT(M1) |   SPECIFY FORMATS(M1,M2) FOR MARKER OBJECT D LAYOUT |
| ⋮ | |
| EMG | END MASTER ENVIRONMENT GROUP |
| BPG (E) | BEGIN PAGE WITH PGD (E) AS MODEL |
|   BAG |   BEGIN PAGE OR ACTIVE ENVIRONMENT GROUP |
|     MPG (E,E') |     SPECIFY PAGE MODEL (E') |
|     OBD (A) |     DEFINE OBJECT(A) AREA |
|     OBP (A) |     SPECIFY POSITION OF(A) ON PAGE (E) |
|     OBD (B) |     DEFINE OBJECT (B) AREA |
|     OBP (B) |     SPECIFY POSITION OF (B) ON PAGE (E) |
| ⋮ | |
|     OBP (C) |     SPECIFY POSITION OF (C) ON PAGE (E) |
|     MMOB (D,A), POS($X_1,Y_1$), FORMAT (M1) |     MAP MARKER TO OBJECT AREA A AT POSITION ($X_1,Y_1$) |
|     MMOB (D,B), POS($X_2,Y_2$), FORMAT (M1) |     MAP MARKER TO OBJECT AREA B AT POSITION ($X_2,Y_2$) |
|     MMOB (D,C), POS ($X_3,Y_3$), FORMAT (M2) |     MAP MARKER TO MARKER OBJECT AREA C AT POSITION ($X_3,Y_3$) |
| ⋮ | |
|   EAG |   END PAGE ENVIRONMENT GROUP |
| ⋮ | |
| EPG | END PAGE |
| (\* PROCESS UPDATES DATA FOR MARKER OBJECT (C)) | |
| ⋮ | |
| EDT | END DATA STREAM |

*Fig. 4*

DATA STREAM EXAMPLE FOR FIGURE 3

```
BDT                                BEGIN DATA STREAM
  IRG (RES B)                        ACTIVATE RESOURCE GROUP (RES B)
  BMG                                BEGIN MASTER ENVIRONMENT GROUP
    DMO(30),DATA=B,TYPE=IMAGE,         DEFINE MARKER (30)
        SCALE= SHRINK"X" PERCENT
    •
    •
    •
  EMG                                END MASTER ENVIRONMENT GROUP
  •
  •
  •
  BPG                                BEGIN PAGE
    OBD(A)                             DEFINE MARKER OBJECT AREA (A)
    OBP(A)                             (X,Y) POSITION OF(A)
    OBD(B)                             DEFINE OBJECT AREA (B)
    OBP(B)                             (X,Y) POSITION OF (B)
    •
    •
    MBG (B,B)                          MAP BUSINESS GRAPHICS OBJECT(B) TO AREA(B)
    MMOB(30,A), POS(X₁,Y₁)             MAP MARKER OBJECT (30) TO AREA (A)
    •
    •
  EPG                                END PAGE
  •
  •
EDT                                END DATA STREAM
```

*Fig. 5*

```
RESOURCE (B) SPECIFICATION
  BRG (RES B)                        BEGIN RESOURCE (RES B)
    BBG (B)                            BEGIN BUSINESS GRAPHICS OBJECT(B)
      BGD                                BUSINESS GRAPHICS DESCRIPTOR
      BGA                                BUSINESS GRAPHICS DATA
      •
      •
    EBG (B)                            END BUSINESS GRAPHICS OBJECT(B)
    •
    •
  ERG (RES B)                        END RESOURCE (RES B)
```

METHOD OF MANAGING MARKER ENTITIES WITHIN A DOCUMENT DATA STREAM

BACKGROUND OF THE INVENTION

1. Technical Field

This invention relates in general to the field of document data stream manipulation and in particular to methods for creating, describing, and controlling the management of "marker" entities within the data stream.

2. Background Art

The provision of selected enumerative processes at the application level within certain computer applications is well known in the prior art. For example, a word processing program often provides a page numbering function which may be utilized to provide page numbers for documents produced with that word processor. The same word processing program might also provide a numeric referencing function which may be used to reference a specific part of a document, such as a page, section or figure. Usually, the value of the numeric reference is not treated as a separate entity by the word processing system. Rather, it is included as part of the text data containing the references. Unlike the method of the present invention, the enumerative capability in word and other document type processors is tightly coupled to the imaging and presentation formatting functions of a specific document processing application, and may not be generally available so that a description as well as presentation and manipulation of the numeric entity is independent of any processing of the document data content.

Despite the fact that the enumerative processing techniques described above cannot be independently associated with the content of a particular portion of the document in question, it is possible with certain APA type user interfaces to create an iconic representation of data within an application which is linked to the data itself. While this technique does provide a graphic representation which may be used within the application and which is related to the content of the application, it is only available at the application level and cannot be physically utilized with non-graphic content, such as text.

Therefore, it should be obvious that a need exists for a method whereby marker entities, e.g. enumerative processing entities, that are data type independent may be created, described, and controlled at a data stream level independent of any document processing application and may also be physically and/or logically related to other data stream entities of the same or different data type.

SUMMARY OF THE INVENTION

It is therefore one object of the present invention to provide an improved method of manipulating document data streams.

It is another object of the present invention to provide an improved method of manipulating document data streams which permits the utilization and manipulation of marker entities within the data stream independently of the content of the data stream.

It is yet another object of the present invention to provide an improved method of manipulating document data streams which permits the utilization and manipulation of marker entities within the data steam independently of the content of the data stream and which may be logically or physically associated with an entity within the data stream at either a document or lower order entity level.

The foregoing objects are achieved as is now described. The method of the present invention provides a consistent specification and independent processing for marker entities which may include both text and non-text data and which may be associated physically and/or logically with data stream content at the document or lower order entity level. A define marker structure control is utilized, within the data stream, to specify in a data type independent fashion the physical structure and content of a marker entity as well as defining any desired relationship of a marker entity with another entity within the data stream. A map marker control is then utilized to control the position within a presentation area where the marker entity is to be imaged. In this manner, the method of the present invention provides a flexible, efficient and useful manner of providing a marker entity within a document data stream which may be tied to specific layout areas during presentation and which may be easily manipulated at a data stream level.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a high-level data stream representation of the marker entity of FIG. 2;

FIG. 5 is a high-level data stream representation of the marker entities of FIG. 3;

FIG. 6 is a high-level data stream representation of a resource specification which may be utilized in conjunction with the data stream representation of FIG. 5;

DETAILED DESCRIPTION OF THE PREFERRED EMBODIMENT

Figure 1:
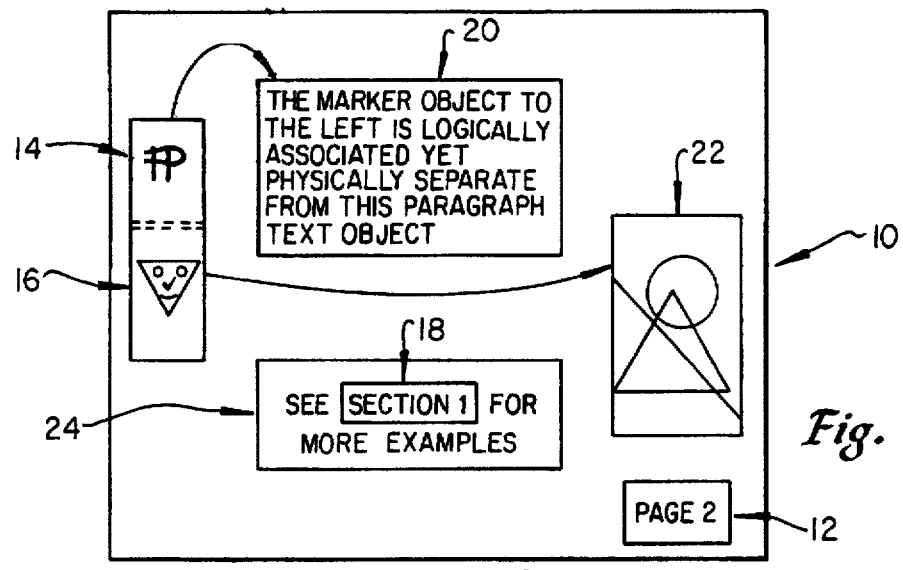
FIG. 1 is a pictorial representation of a presentation of a document including multiple marker entities.

With reference now to the figures and in particular with reference to FIG. 1, there is depicted a pictorial representation of a presentation 10 of a portion of a document which includes multiple marker entities 12, 14, 16, and 18. Each marker entity within presentation 10 is defined, as will be explained in greater detail herein, by a define marker structure control, which specifies the physical structure and content of the marker entity as well as any desired logical relationship between the marker entity and another entity within the data stream. A map marker control is also utilized to specify those locations within presentation 10 where the marker is to be imaged.

As may be seen, each marker entity may include both textual and non-textual data such as, graphic data or image data. For example, marker entity 12 includes the textual data "PAGE 2" and is logically and physically unrelated to any data object within presentation 10. In contrast, marker entity 14 includes a graphic paragraph symbol which is logically associated with and yet physically separate from the paragraph text object depicted at reference numeral 20.

Also depicted within FIG. 1 is marker entity 16 which is also logically related to and yet physically separate from graphic data object 22. Finally, marker entity 18 is depicted. Marker presentation 18 is both logically and physically related to the content of text data object 24 in that both the location and content of marker entity 18 is controlled by the location and content of text data object 24. By linking marker entity 18 to the content of text data object 24, it is possible to manipulate marker entity 18 at the data stream level without the necessity of manipulation within the presentation space.

Figure 2:
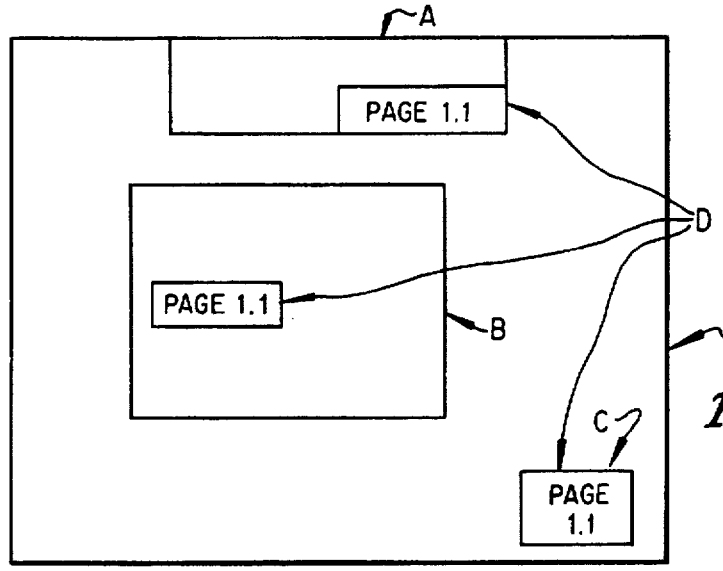
FIG. 2 is a pictorial representation of a presentation of a document which includes multiple replications of a single marker entity.

Referring now to FIGS. 2 and 4 there is depicted respectively a pictorial representation of a presentation E of a document which includes multiple replications of a single marker entity and a high-level data stream representation of that presentation. As may be seen, the high-level data stream representation of the presentation of FIG. 2 begins with a Begin Data Stream (BDT) control and a Begin Master Environment Group (BMG) control. A Define Marker (DMO) control is then utilized to define the physical structure and content of marker entity D, as depicted in FIG. 2.

Next, the area of marker object D is defined by the Object Define (OBD) control and the model to be utilized for odd and even numbered pages is specified along with the object areas, which are examples of presentation areas to be utilized on each page. The RTD control is then utilized to specify the various formats to be utilized for imaging the content of each marker entity. As may be seen in FIG. 2, the content of marker entity C is imaged in a different format than the content of marker entities A and B. The End Master Environment Group (EMG) control is then utilized to signify the completion of the specification of the environment.

Still referring to FIG. 4, the data stream depicted continues with the Begin Page (BPG) control which signifies the beginning of a page which follows the odd numbered model specified above. The environment group for this page begins and the next series of controls is utilized to specify the page and define object areas A and B. The positions on the page for marker entities A, B, and C are also specified by utilizing an Object Position (OBP) control.

Next, in accordance with an important feature of the present invention, a Map Marker Object (MMOB) control is then utilized to map marker entity D into object areas A, B, and C, at a series of specified locations which are listed as cartesian coordinates in the depicted example. Additionally, as illustrated, the Map Marker Object control also provides a format characterization such that marker entity D may be replicated in a different format, as discussed above. As may be seen, marker entity D within object area C is presented in format M2, as contrasted to format M1 which is utilized within object areas A and B.

In this manner, the method of the present invention permits a marker entity to be consistently specified and defined at the data stream level. The position, format and content of each marker entity may be easily modified as necessary by the operator, or by an enumerative process.

Another important feature of the present invention may be illustrated with reference to FIG. 3 wherein a pictorial representation of a presentation of a document which includes a marker entity A which depicts an iconic representation 30 of a graphic data object B within the document. The method for producing the presentation of FIG. 3 may be illustrated upon referring to FIG. 5 wherein a high-level data stream representation of the presentation of FIG. 3 is depicted, as well as FIG. 6, in which a high-level data stream representation of a resource specification which may be utilized in conjunction with the data stream of FIG. 5 is depicted.

As above, the data stream example depicted in FIG. 5 begins with a Begin Data Stream (BDT) control and thereafter activates a resource group characterized as resource group B. The Master Environment Group is then initiated by the BMG control and marker object 30 is defined, as above, by utilizing a Define Marker Object (DMO) control. As is illustrated, the marker object 30 is defined as including the data contained within object area B in an image type presentation which has been scaled down by a specified percent. As is illustrated in FIG. 3, this particular marker definition will result in the creation of an iconic representation of the data within object area B which is displayed in object area A as a miniature representation of the data within object area B. Thereafter, the Master Environment Group ends as depicted by the EMG control.

Next, the page presentation is begun, as illustrated by the Begin Page (BPG) control and a series of definition and specification controls are then utilized, as discussed above, to define an area and the position at which marker data is to be imaged within the object area. Thereafter, the business graphics object depicted within object area B is mapped to area B and marker object 30 is also mapped within object area A at position (X,Y) by the utilization of a Map Marker Object control in the manner of the present invention.

Figure 3:
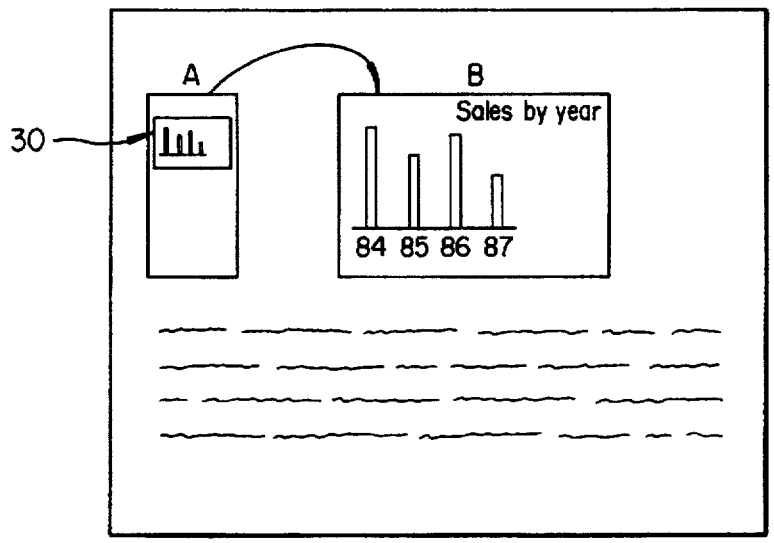
FIG. 3 is a pictorial representation of a presentation of a document which includes a marker entity depicting an iconic representation of a data object within the document.

FIG. 6, as those skilled in the art will appreciate, depicts a resource specification which may be utilized, in a manner well known in the art, to generate the business graphics object depicted within object area B of FIG. 3. This resource specification is included in the specification of this application by way of illustration and is meant only to describe one technique whereby a graphics object may be specified so it can be used to produce a marker entity which is an iconic representation of the graphics object.

Figure 7:
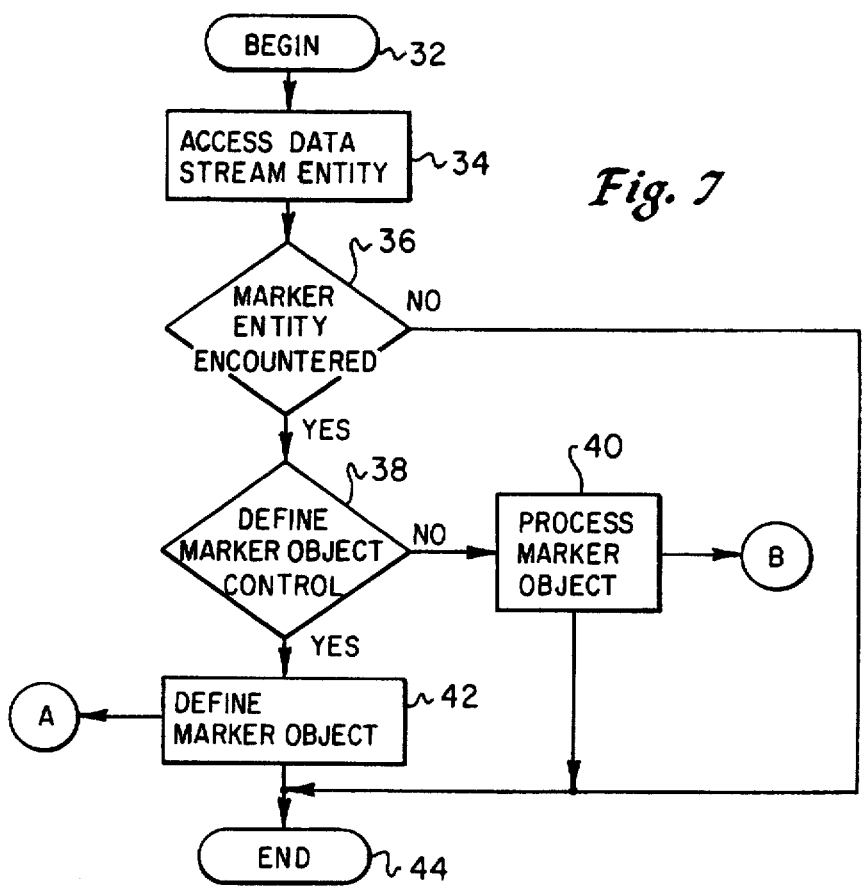
FIG. 7 is a logic flow diagram of the processing of a document data stream including marker entities.

With reference now to FIG. 7, there is depicted a logic flow diagram of the processing of a document data stream which includes marker entities in accordance with the method of the present invention. As may be seen, upon beginning at block 32, block 34 illustrates the accessing of the data stream entity in accordance with normal data stream processing procedures. Thereafter, decision block 36 is utilized to determine whether or not a marker entity has been encountered. If not, the process proceeds to block 44 and ends.

In the event a marker entity is encountered as detected by decision block 36, decision block 38 is utilized to determine whether or not the marker entity encountered is a Define Marker Object control. If not, the marker object is processed as illustrated in block 40 by reference to the logic flow diagram illustrated in FIG. 9. Thereafter, the process ends, as above, at block 44. In the event the marker object detected is a Define Marker Object, as determined by decision block 38, then the process proceeds to block 42 wherein the Define Marker Object may be utilized to create a marker entity for utilization within a document data stream, as illustrated in the logic flow diagram of FIG. 8. Thereafter, the process again ends as depicted in block 44.

Figure 8:
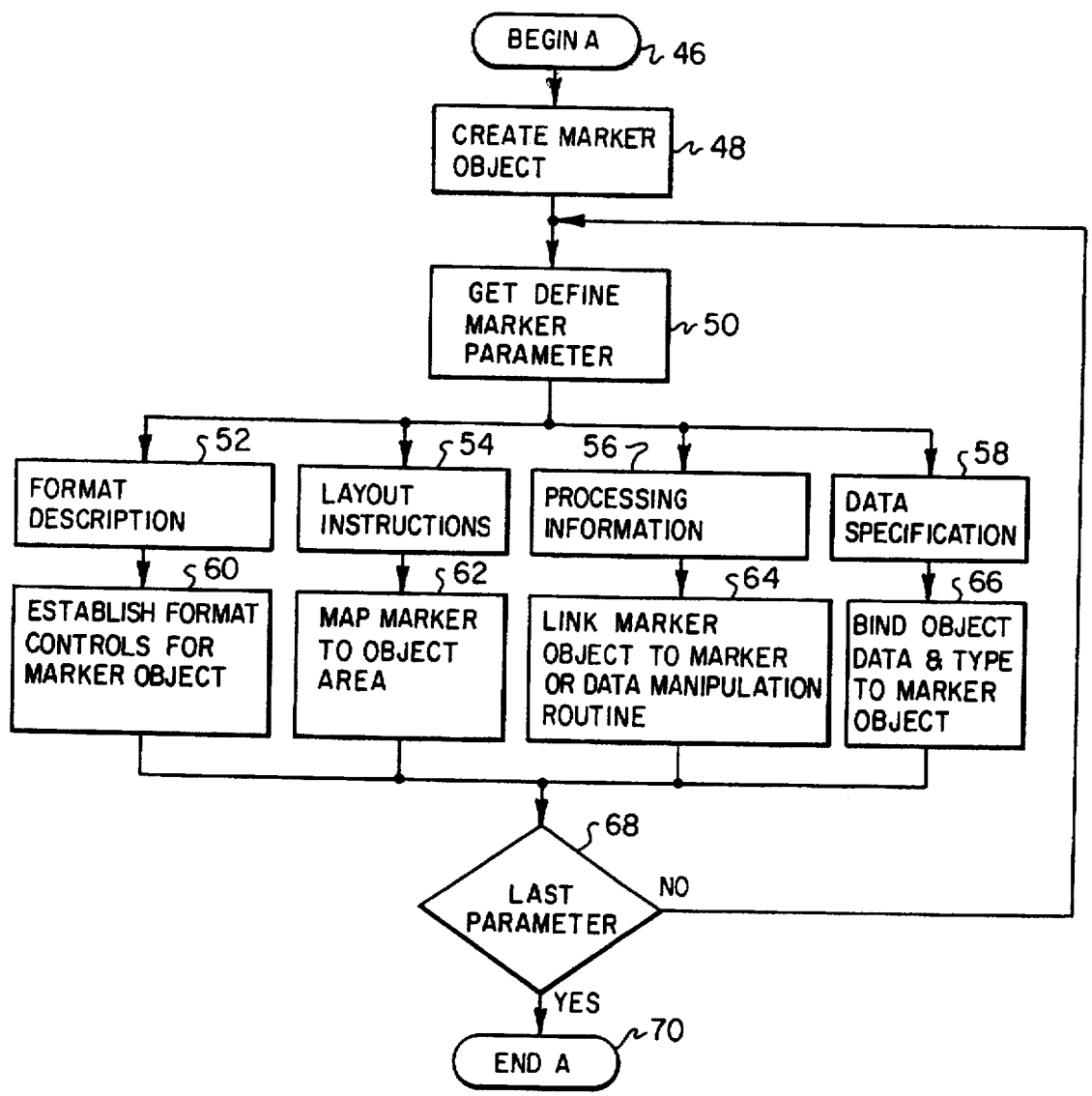
FIG. 8 is a logic flow diagram of the creation of a marker entity for utilization within a document data stream.

Referring now to FIG. 8, there is depicted a logic flow diagram of the process necessary for the creation of a marker entity for utilization within a document data stream. As above, the process begins at block 46 and block 48 illustrates the creation of a marker object. Block 50 then depicts the retrieval of the parameters which allow the user to specify a marker entity.

Thereafter, blocks 52, 54, 56, and 58 may be utilized as desired to describe the format of the marker object, to determine the layout instructions for the marker object, to process the information within the marker object or to specify the data to be utilized by the marker object. In the event it is desired to modify or create the format description for a marker object, block 60 then illustrates the establishment of format controls for utilization with the marker object. If the layout instructions selected in block 54 are required, then block 62 depicts the mapping of the marker object to the desired object area. Similarly, if processing information has been selected by block 56 then block 64 is utilized to link the marker object to the appropriate marker or data manipulation routine which may be utilized, as those skilled in the art will appreciate, to provide a desired enumerative or iterative process. Finally, if data has been specified for utilization in the marker object, as depicted in block 58, then block 66 illustrates the binding of the object data and type to the marker object thus created.

Thereafter, block 68 is utilized to determine whether or not the parameter thus processed is the last parameter within the data stream entity and if not, the process returns to block 50 to begin again. In the event the last parameter has been determined, the process ends, as illustrated in block 70 and the process depicted in FIG. 7 will end as depicted in block 44.

Figure 9:
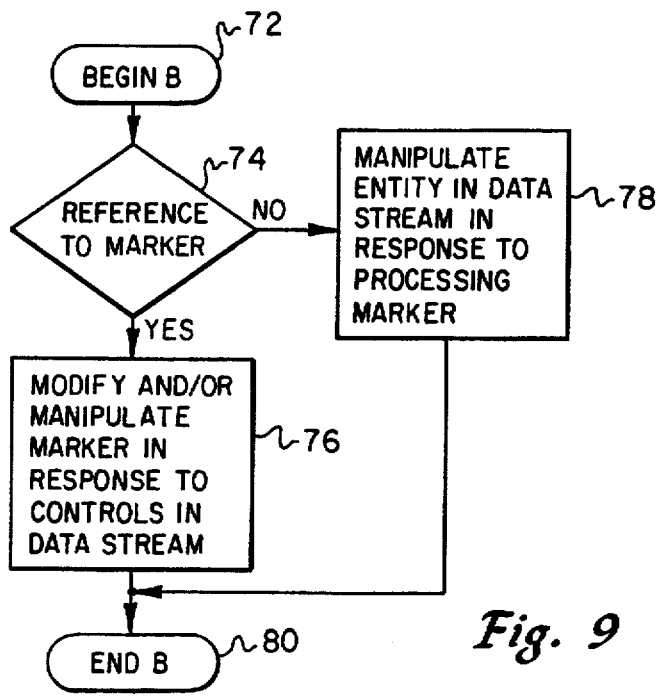
FIG. 9 is a logic flow diagram of the modification and/or manipulation of a marker entity within a document data stream.

Finally, with reference to FIG. 9, there is depicted a logic flow diagram of the modification and/or manipulation of a marker entity within a document data stream. As above, the process begins at block 72 and thereafter decision block 74 is utilized to illustrate whether or not the data stream entity accessed is a reference to a marker. If not, the entity within the data stream is manipulated in accordance with the processing of the marker entity, as illustrated in block 78 and the program ends, as depicted in block 80.

In the event data stream entity accessed at decision block 74 is a reference to a marker entity, then block 76 is utilized to illustrate the modification and/or manipulation of the marker entity in response to controls which are present within the data stream. As above, the process then ends, as illustrated by block 80.

In summary, the method of the present invention provides a substantial improvement in the flexibility, efficiency, and useability of a data stream when there is a requirement to describe and process data generated from a numeric or other enumerative function during processing of the data stream.

Marker entity data in accordance with the present invention is applicable to multiple types of data and may not be limited merely to textual data. Such data may be tied to specific object areas for imaging during presentation and may be utilized to span several separate areas on a single page or multiple pages. Additionally, the method of the present invention provides a manner in which such marker entities may be consistently defined and manipulated at the data stream level such that these processes may take place without the necessity of reducing the data stream to an image type presentation, such as a document.

While the invention has been particularly shown and described with reference to a preferred embodiment, it will be understood by those skilled in the art that various changes in form and detail may be made therein without departing from the spirit and scope of the invention.

We claim:

1. A method of managing marker entities within a document described by a data stream, independently of the data content of that data stream, said method comprising the steps of:

establishing an environment group;

specifying within said environment group a physical structure and a plurality of permitted formats for said marker entity;

independently specifying within said data stream at least one position within a presentation area of said document; and automatically mapping said marker entity at said at least one position within said presentation area of said document utilizing said specified physical structure and a selected one of said plurality of permitted formats wherein said position of said marker entity may be modified independently of said physical structure, format and said data content of said data stream.

2. The method of managing marker entities within a document described by a data stream according to claim 1, further including the step of specifying within said environment group a content for said marker entity.

3. The method of managing marker entities within a document described by a data stream according to claim 2, further including the step of modifying said content in response to a portion of said data content of said data stream.

4. The method of managing marker entities within a document described by a data stream according to claim 1, wherein said step of establishing an environment group comprises the step of establishing an environment group within said data stream.

* * * * *